United States Patent
Matoba

(10) Patent No.: US 8,384,923 B2
(45) Date of Patent: Feb. 26, 2013

(54) IMAGE FORMING APPARATUS, IMAGE FORMING METHOD, AND STORAGE MEDIUM STORING IMAGE FORMING PROGRAM THEREOF

(75) Inventor: Tatsuo Matoba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 630 days.

(21) Appl. No.: 12/617,729

(22) Filed: Nov. 13, 2009

(65) Prior Publication Data

US 2010/0128309 A1 May 27, 2010

(30) Foreign Application Priority Data

Nov. 26, 2008 (JP) ................................. 2008-301716

(51) Int. Cl.
G06F 3/12 (2006.01)
G06K 15/00 (2006.01)
(52) U.S. Cl. ...................... 358/1.13; 358/1.15; 358/1.18
(58) Field of Classification Search .......................... None
See application file for complete search history.

(56) References Cited

U.S. PATENT DOCUMENTS

| 7,221,885 | B2 | 5/2007 | Eiichi |
| 7,466,432 | B2 | 12/2008 | Mitani |
| 8,045,213 | B2* | 10/2011 | Von Spreckelsen et al. .. 358/1.18 |
| 8,081,322 | B2 | 12/2011 | Morikawa et al. |
| 8,154,750 | B2* | 4/2012 | Kita .............................. 358/1.15 |
| 2004/0109175 | A1 | 6/2004 | Hatori et al. |
| 2005/0028700 | A1* | 2/2005 | Hauck ........................... 101/483 |
| 2006/0245006 | A1* | 11/2006 | Nakata et al. ................. 358/448 |

FOREIGN PATENT DOCUMENTS

| JP | 2005-196734 A | 7/2005 |
| JP | 2005297488 | 10/2005 |
| JP | 2007060126 | 3/2007 |
| JP | 2007-283717 A | 11/2007 |
| JP | 2008-179111 A | 8/2008 |

* cited by examiner

*Primary Examiner* — Dov Popovici
(74) *Attorney, Agent, or Firm* — Fitzpatrick, Cella, Harper & Scinto

(57) ABSTRACT

A past print job is held as a history; selection of a target item by a user, from among a plurality of types of print setting items that are settable for a print job in which print processing of image data will be performed, is received; with respect to the target item, a search is performed for a past print job in which the content of the target item was set; a list of past print jobs is displayed; selection of a print job by the user, from among the list of past print jobs that was displayed, is received; the content of the target item that has been set for the selected past print job is set to the print job of the image data; and print processing of the image data is performed using the print job for which settings have been set.

6 Claims, 10 Drawing Sheets

FIG. 4

```
...
<registered image information>
    <image data ID="001"...>
        <image file uri="/image/docmng/.../080601.jpg"/>
        <image file uri="/image/docmng/.../080602.jpg"/>
        <print settings>
            ...
            <type="paper type" value="standard paper"/>
            ...
        </print settings>
    </image data>
    <image data ID="002"...>
        <image file uri="/image/docmng/.../080701.jpg"/>
        <print settings>
            ...
            <type="paper type" value="heavy paper"/>
            ...
        </print settings>
    </image data>
    ...
</registered image information>
...
```

```
...
<device ID ID="c-mfp1" uri="123.45.56.78"device name="color MFP"/>
<print function >
...
</print function >
<post-processing function >
...
</post-processing function >
<apparatus accessory >
...
</apparatus accessory >
<print settings possible attribute information >
    <paper type value="standard paper, heavy paper, recycled paper, colored paper, ···"/>
    <paper size  value="A4, A4R, A3, A5, A5R, B4, B5, B5R, ···"/>
    <color classification value="color, monochrome, ···"/>
    <duplex designation value="simplex, duplex, ···"/>
    <bookbinding settings >
        <open left-right="left, right, ···"/>
        <original size value="A4, A4R, A3, A5, A5R, B4, B5, B5R, ···"/>
        <cover print value="front cover front, front cover back, back cover front, back cover back"/>
        <cover paper size value="A4, A4R, A3, A5, A5R, B4, B5, B5R, ···"/>
        <binding settings value="saddle stitching, no binding, ···"/>
    </bookbinding settings >
    <print position settings ="up, down, left, right, ···"/>
    <composite settings >
    ...
    </composite settings >
    <color adjustment settings >
    ...
    </color adjustment settings >
    <index sheet settings >
    ...
    </index sheet settings >
</print settings possible attribute information >
...
```

501 — device ID line
502 — print settings possible attribute information
5021 — paper type
5022 — paper size
5023 — color classification
5024 — duplex designation
5025 — bookbinding settings
5026 — print position settings
5027 — composite settings
5028 — color adjustment settings
5029 — index sheet settings
500 — overall block

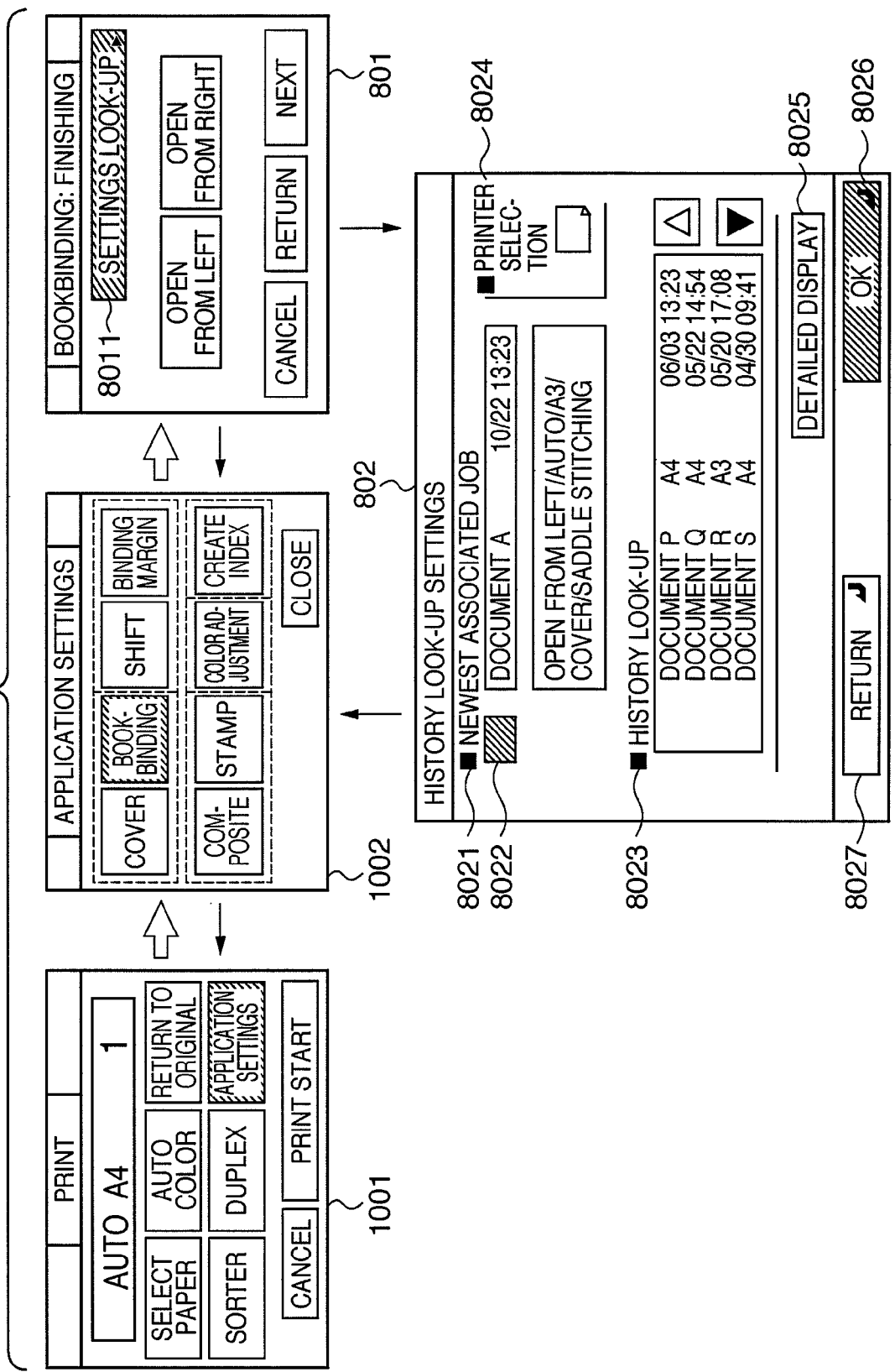

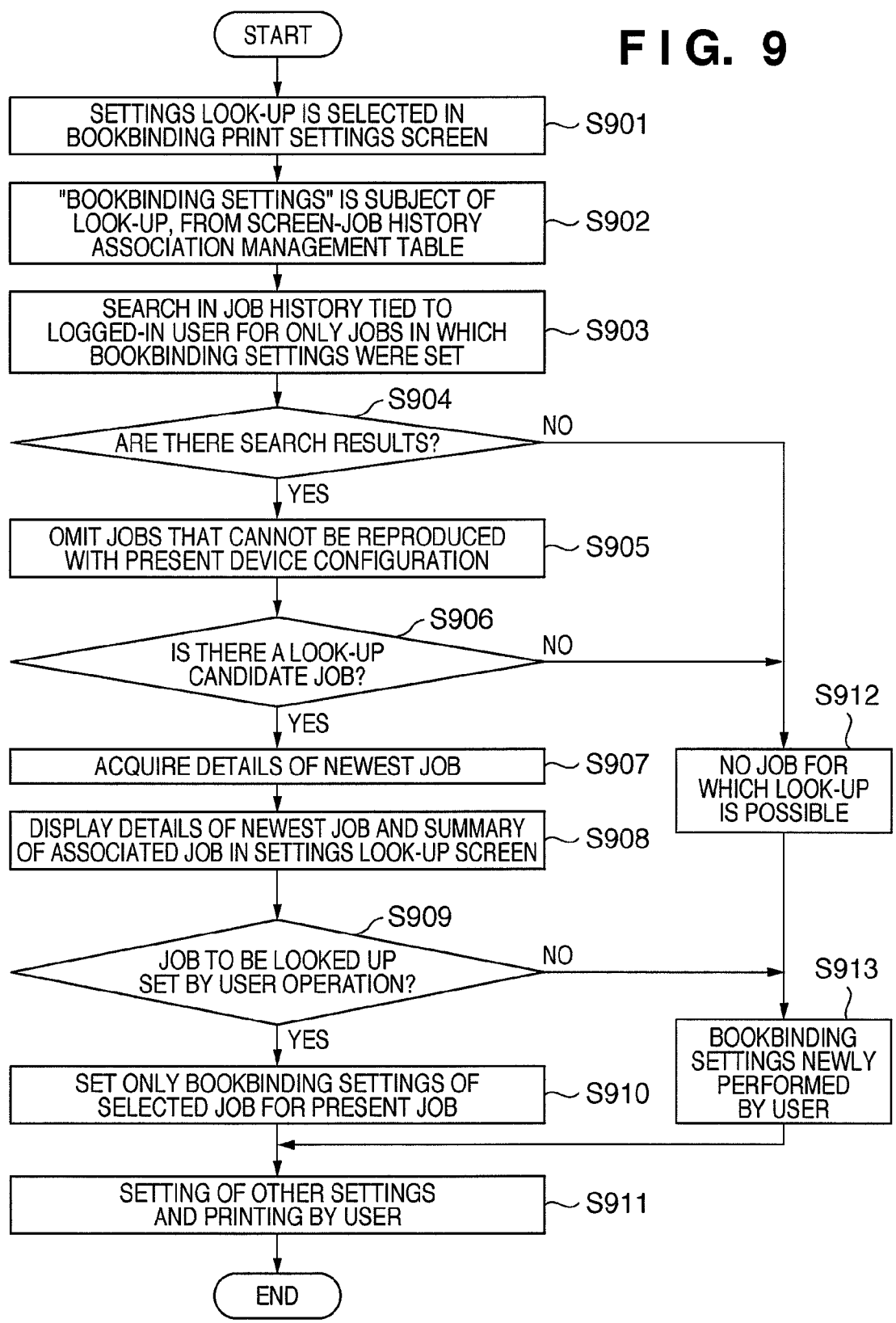

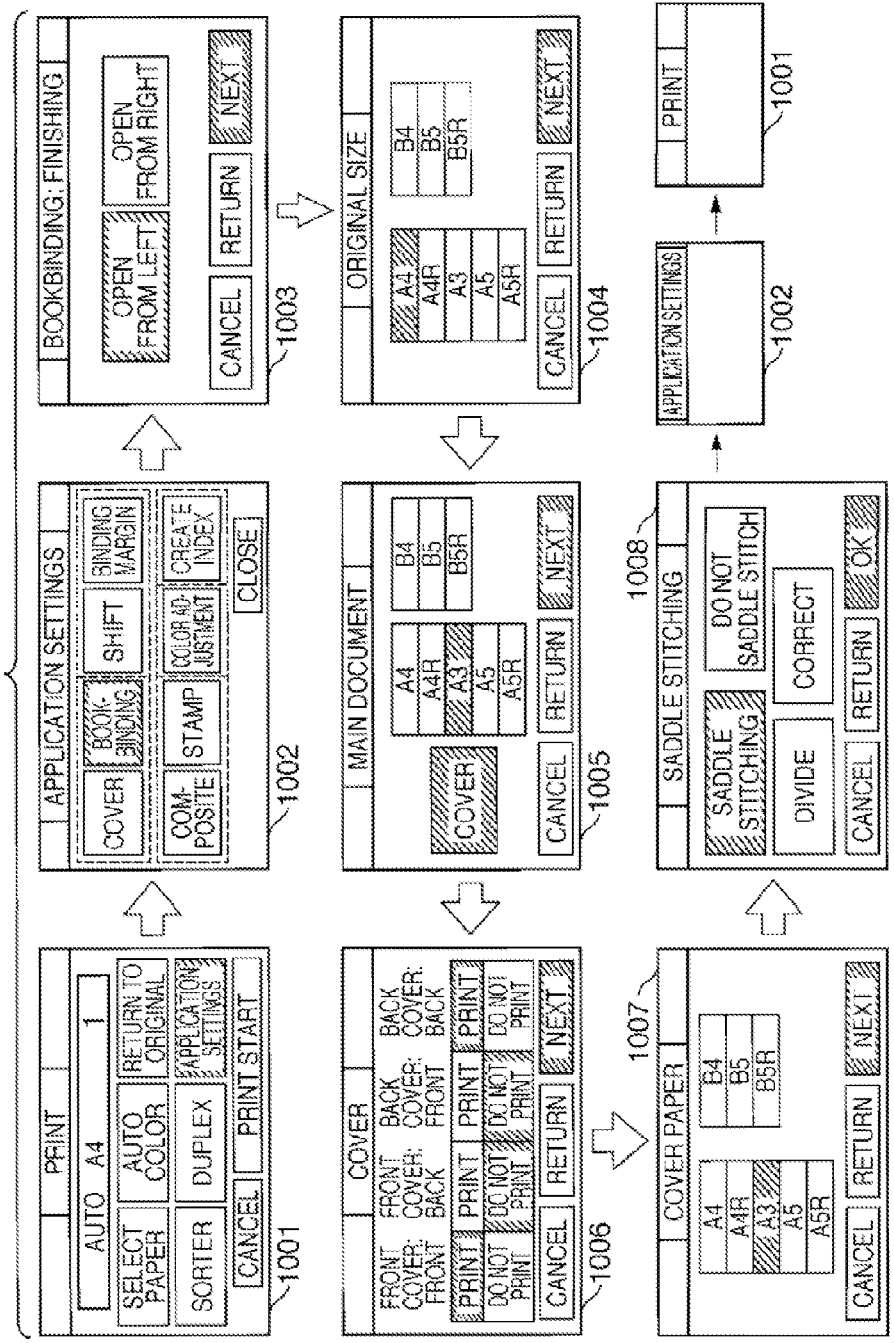

IMAGE FORMING APPARATUS, IMAGE FORMING METHOD, AND STORAGE MEDIUM STORING IMAGE FORMING PROGRAM THEREOF

BACKGROUND OF THE INVENTION

1. Field of the Invention

The present invention relates to an image forming apparatus that prints an image, an image forming method, and a storage medium that stores an image forming program thereof.

2. Description of the Related Art

Recently, functions of image forming apparatuses have increased, and in order to execute a complicated job such as bookbinding printing, settings in a screen by a user are also complicated, which is a burden on the user. Therefore, there have been demands to increase the convenience of performing settings in the image forming apparatus by reusing past settings.

Conventionally, as technology for calling and reusing a screen operation history, technology is known whereby in coordination with a user authentication, an individual's operation history of an image forming apparatus or a remote image forming apparatus that is operated is called and made reusable in a screen operation (Japanese Patent Laid-Open No. 2005-297488).

Technology is also known in which, with respect to a job history stored in an image forming apparatus or a remote image forming apparatus that is operated, reprinting is made possible by designating one job in the job history (Japanese Patent Laid-Open No. 2007-60126).

However, in the technology described in above Japanese Patent Laid-Open No. 2005-297488, it is only possible to reproduce screen operations. Therefore, the job history cannot be reused in a case where even though the content of settings of a job recorded in the history is the same, a settings procedure in a screen is different. For example, when job types, such as copying, box document printing, or printing from a PC, differ, the method for performing settings in a provided screen ordinarily differs between jobs even if the settings of jobs recorded in the history are the same, so the job history cannot be interchangeably reused.

Also, in the technology described in above Japanese Patent Laid-Open No. 2007-60126, it is possible to designate a job from the job history to perform reprinting to obtain the same output result, but when performing settings of a new job in a screen, it is not possible to reuse a portion of the settings. For example, when setting a new bookbinding printing job, even when finishing is desired with the same bookbinding settings that were set once in the past, it is not possible to appropriate only settings related to bookbinding printing from the job history, rather, it is only possible to reexecute a job from the history.

SUMMARY OF THE INVENTION

The present invention provides an image forming apparatus whereby it is possible to flexibly reuse a history when making job settings, an image forming method, and a storage medium that stores an image forming program thereof.

The present invention in its first aspect provides an image forming apparatus that performs print processing of image data, the image forming apparatus comprising: a holding unit configured to hold a past print job as a history; a first receiving unit configured to receive selection of a target item by a user, from among a plurality of types of print setting items that are settable for a print job in which print processing of the image data will be performed; a search unit configured to, with respect to the target item, search in the history for a past print job in which the content of the target item was set; a display unit configured to display a list of past print jobs that were found by the search unit; a second receiving unit configured to receive selection of a print job by the user, from among the list of past print jobs that was displayed; a setting unit configured to set the content of the target item that has been set for the selected past print job to the print job of the image data; and a print unit configured to perform print processing of the image data, using the print job for which settings have been set by the setting unit.

The present invention in its second aspect provides an image forming method executed in an image forming apparatus that performs print processing of image data, the image forming method comprising: a holding step of holding a past print job as a history; a first receiving step of receiving selection of a target item by a user, from among a plurality of types of print setting items that are settable for a print job in which print processing of the image data will be performed; a searching step of, with respect to the target item, searching in the history for a past print job in which the content of the target item was set; a display step of displaying a list of past print jobs that were found in the search step; a second receiving step of receiving selection of a print job by the user, from among the list of past print jobs that was displayed; a setting step of setting the content of the target item that has been set for the selected past print job to the print job of the image data; and a printing step of performing print processing of the image data, using the print job for which settings have been set in the setting step.

The present invention in its third aspect provides a computer-readable storage medium that stores an image forming program for performing print processing of image data, the image forming program causing a computer to function to perform control so as to: hold a past print job as a history; receive selection of a target item by a user, from among a plurality of types of print setting items that are settable for a print job in which print processing of the image data will be performed; with respect to the target item, search in the history for a past print job in which the content of the target item was set; display a list of past print jobs that were found; receive selection of a print job by the user, from among the list of past print jobs that was displayed; set the content of the target item that has been set for the selected past print job to the print job of the image data; and perform print processing of the image data, using the print job for which settings have been set.

According to the present invention, it is possible to flexibly reuse a history when making job settings.

Further features of the present invention will become apparent from the following description of exemplary embodiments with reference to the attached drawings.

BRIEF DESCRIPTION OF THE DRAWINGS

FIG. 4 shows an image information management table shown in XML format that is stored in an image information storage unit.

FIG. 5 shows an example of a device configuration information table shown in XML format that is stored in a device configuration information storage unit.

FIG. 8 shows a screen flow of print settings when searching in history job settings information for settings information of an item to be set, and reusing that settings information, in the present embodiment.

FIG. 9 shows a procedure of one iteration of processing up to performing settings for a new job and printing, in the present embodiment.

FIG. 10 shows a conventional screen flow of print settings.

DESCRIPTION OF THE EMBODIMENTS

Figure 1:
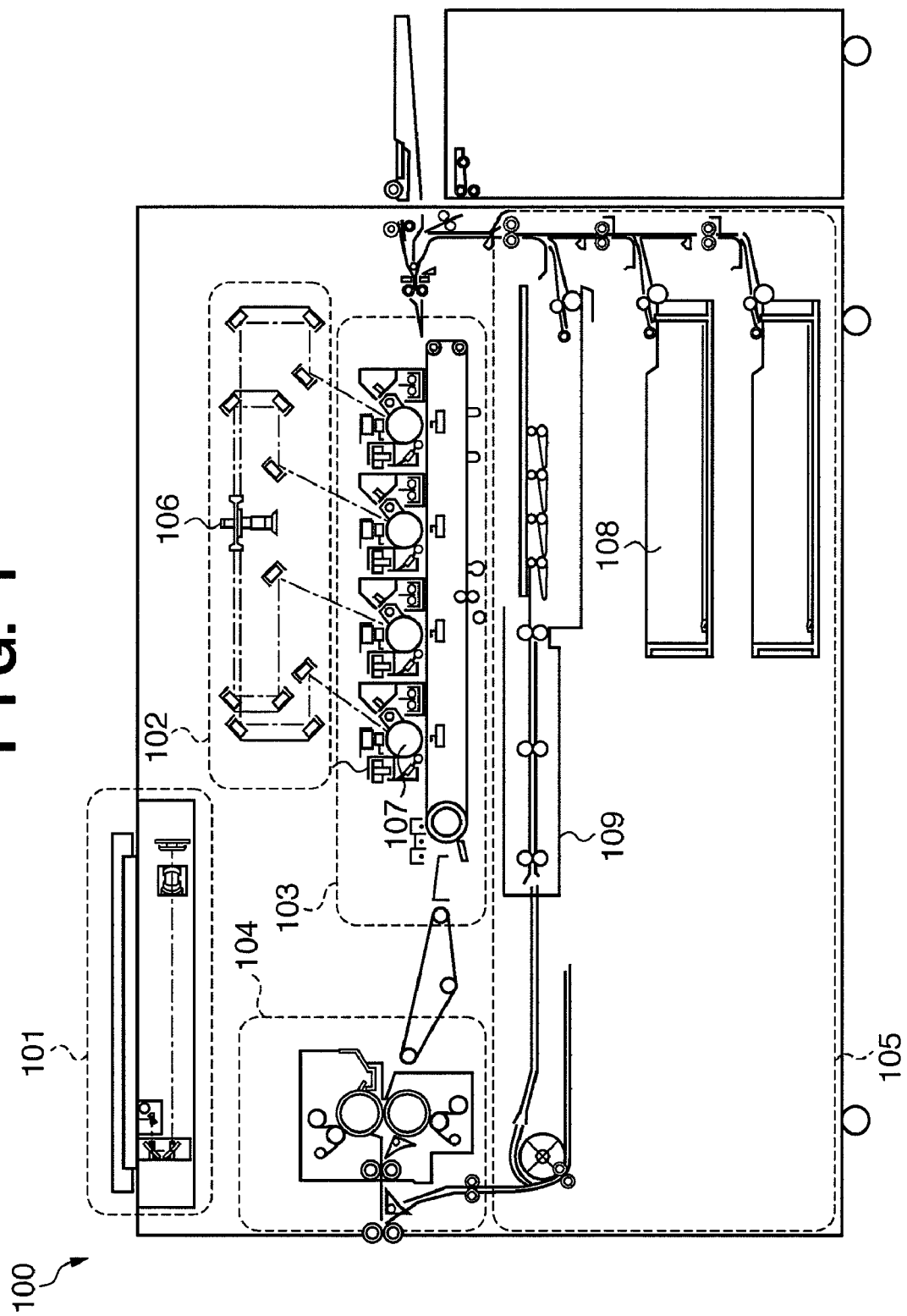
FIG. 1 illustrates the internal structure of an image forming apparatus according to an embodiment of the present invention.

Following is a detailed description of embodiments of the present invention, with reference to the drawings. The same reference numerals are assigned to the same constituent elements, and a duplicate description thereof is omitted.

Embodiment 1

Here, an example of an image forming apparatus in a representative embodiment of the present invention will be described. FIG. 1 illustrates the internal structure of an image forming apparatus 100 in an embodiment of the present invention. The image forming apparatus 100 is an image forming apparatus having various functions, such as scanning, printing, copying, and boxing (a function of storing an image in a storage area within a device, for the purpose of reprinting or the like). Below, such an image forming apparatus is referred to as an "MFP" (Multi Function Peripheral).

A monochrome device and a color device exist in the MFP, and because speed, cost, and so forth differ between the respective devices, a different device is used depending on the application. However, except for color processing, internal data, and so forth, with respect to basic portions, a full-color device often includes the configuration of a monochrome device, so here, mainly a full-color device will be described.

The image forming apparatus 100, which is a full-color MFP, includes a scanner unit 101, a laser exposure unit 102, an image forming unit 103, a fixing unit 104, a feed/conveyance unit 105, and an MFP control unit 200 described later that controls these constituent parts.

The scanner unit 101 applies light to an original that has been placed on a platen to optically read an original image, and converts that image to an electrical signal to create image data. The laser exposure unit 102 causes a light ray such as a laser beam modulated according to the image data to be incident on a rotating polygon mirror 106 that rotates at an equiangular velocity, and this light is irradiated on a photosensitive drum 107 as reflected scanning light.

In the image forming unit 103, the photosensitive drum 107 is rotationally driven, charging is performed with a charger, and a latent image that has been formed on the photosensitive drum 107 by the laser exposure unit 102 is developed with toner. That toner image is transferred to a sheet, and a small amount of toner that remains on the photosensitive drum 107 without being transferred at that time is recovered. There are four successive development units (development stations) that execute this sort of one iteration of an electrophotographic process.

The four successive development units lined up in the order cyan (C), magenta (M), yellow (Y), black (B), after passage of a predetermined time period from the start of image formation at the cyan station, sequentially execute image formation for magenta, yellow, and black. With this timing control, a full-color toner image without color shift is transferred onto a sheet.

The fixing unit 104 is configured by a combination of rollers and belts, and includes a heat source such as a halogen heater, and employs heat and pressure to melt and fix the toner on the sheet to which a toner image has been transferred by the image forming unit 103.

The feed/conveyance unit 105 has at least one sheet repository 108, typified by a sheet cassette or a paper deck, and in response to an instruction from the MFP control unit 200, separates one sheet from a plurality of sheets that are stored in the sheet repository 108, and conveys that sheet from the image forming unit 103 to the fixing unit 104.

The sheet is conveyed, and by the above-described development stations, toner images of each color are transferred to the sheet, so that ultimately a full-color toner image is formed on the sheet. Also, when forming an image on both faces of the sheet, control is performed such that after the sheet has passed through the fixing unit 104, the sheet passes through a duplex conveyance path 109 where the sheet is conveyed to the image forming unit 103.

The MFP control unit 200 controls the image forming apparatus 100 as a whole, and, while managing the state of the respective units responsible for the above-described scanning, laser exposure, image forming, fixing, and feed/conveyance, gives instructions such that the whole can operate harmoniously and smoothly.

With respect to the configuration of this system, as for the image forming apparatus 100 included in the configuration, a configuration may be adopted in which there are a plurality of image forming apparatuses, or in which a plurality of image forming apparatuses are combined. Here, in order to simplify the description, when referring to a particular image forming apparatus from among a plurality of image forming apparatuses 100(1), 100(2), . . . , 100(N), that particular image forming apparatus is referred to as an image forming apparatus 100(X).

Also, when referring to all of the image forming apparatuses 100(1), 100(2), . . . , 100(N), they are referred to as simply the image forming apparatus 100. Also, a configuration may be adopted in which an image forming apparatus is combined with an SFP (Single Function Peripheral) such as a single function image forming apparatus provided with only a print function. Also, an image forming apparatus may be combined with an ordinary information processing apparatus (computer) that is provided with a network connection configuration, and is configured with a CPU, a ROM, a RAM, an HDD, and so forth.

Figure 2:
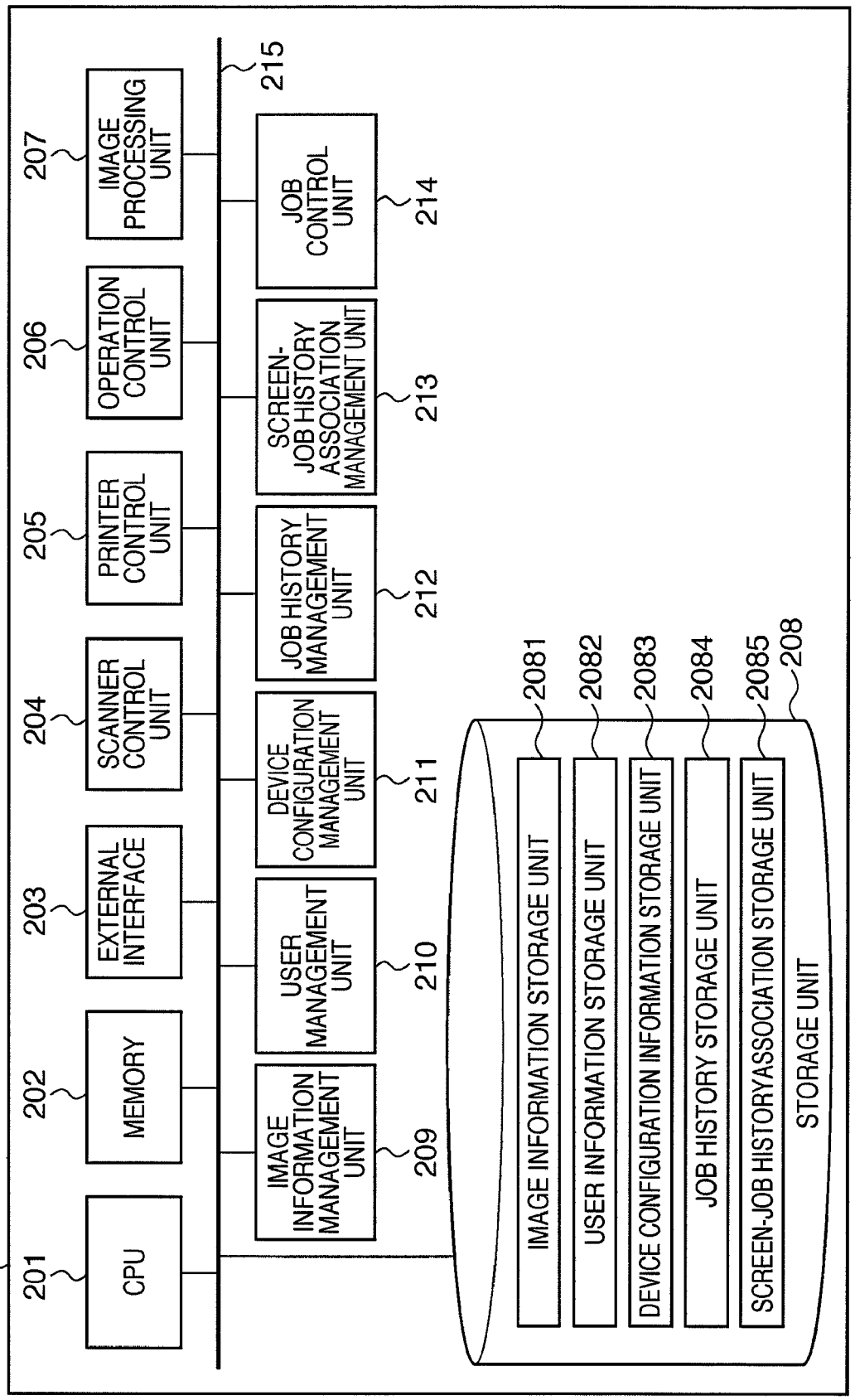
FIG. 2 is a block diagram that shows the configuration of an MFP control unit in the image forming apparatus shown in FIG. 1.

FIG. 2 is a block diagram that shows the configuration of the MFP control unit 200 in the image forming apparatus 100 shown in FIG. 1.

Each of a scanner control unit 204 to an image processing unit 207, and an image information management unit 209 to a job control unit 214, are processing modules that constitute the MFP control unit 200. These processing modules operate as application programs used in a CPU 201, or as part of such a program.

A storage unit 208 shown in FIG. 2, and an image information storage unit 2081, a user information storage unit 2082, a device configuration information storage unit 2083, a job history storage unit 2084, and a screen-job history association storage unit 2085, which are parts of the storage unit 208, are information storage units in the MFP control unit 200. A non-volatile hard disk, memory, or the like in a file system, a database system, or the like is used in the storage unit 208 and each of the image information storage unit 2081 to the screen-job history association storage unit 2085, which are parts of the storage unit 208. Also, as for accessing information stored in the storage unit 208, direct access to particular information by a designated key or condition is possible.

The CPU 201 controls the whole of the image forming apparatus 100, reads out and executes programs stored in a memory 202 or the storage unit 208, and instructs the respective units. Thus, operation for scanning, printing, faxing, or the like is realized. Also, the CPU 201 performs print control so as to realize print processing in the present embodiment.

The memory 202 is configured with a ROM that stores various programs executed by the CPU 201, a RAM that temporarily stores data necessary for control or the like, and so forth. Here, various programs includes programs that realize each of the scanner control unit 204 to the image processing unit 207, and the image information management unit 209 to the job control unit 214.

An external interface 203, via a network or a removable external storage apparatus (not shown), sends/receives information to/from another image forming apparatus 100 (X) or image processing apparatus that is external and has the same configuration.

The scanner control unit 204 controls the scanner unit 101 to drive the scanner unit 101 according to instructions from the CPU 201 to read an original on the platen, and store the read original in the memory 202.

A printer control unit 205 acquires image data from the memory 202, the image information storage unit 2081 of the storage unit 208, and so forth according to instructions from the CPU 201. Also, the printer control unit 205 controls the laser exposure unit 102, the image forming unit 103, the fixing unit 104, the feed/conveyance unit 105, and so forth to output an image by printing the image on printing paper.

An operation control unit 206 operates according to instructions from the CPU 201, and controls an operation unit 300 constituted from a touch panel unit 301, a key input unit 302, and so forth provided in the image forming apparatus 100. Information emitted due to an operator operating the touch panel unit 301 or the key input unit 302 is transmitted to the parts of the image forming apparatus 100 to operate the apparatus.

The image processing unit 207 operates according to instructions from the CPU 201, and performs image processing instructed by the operator via the operation control unit 206 or the like, analysis of image data stored in the memory 202 by the scanner control unit 204, and so forth.

The image information management unit 209 operates according to instructions from the CPU 201, and manages registration, look-up, updating, deletion, and so forth of image data stored in the image information storage unit 2081 of the storage unit 208. The image information management unit 209 may also manage print settings information (print settings of paper type, paper size, color classification, duplex/simplex printing, and so forth) associated with image data in the image information storage unit 2081.

A user management unit 210 operates according to instructions from the CPU 201, and manages registration, look-up, updating, deletion, and so forth of user information stored in the user information storage unit 2082 of the storage unit 208. Also, the user management unit 210 performs access control so as to request authentication by a user ID and password or the like when a user uses the image forming apparatus 100.

A device configuration management unit 211 operates according to instructions from the CPU 201, and manages registration, look-up, updating, deletion, and so forth of print settings possible attribute information based on device configuration information stored in the device configuration information storage unit 2083 of the storage unit 208. Here, print settings possible attribute information is information that can be set for a job in the image forming apparatus 100. Device configuration information is information of an inline finisher (bookbinding mechanism, folding mechanism, hole-forming mechanism, or the like) provided in the image forming apparatus 100. The inline finisher installed in the image forming apparatus 100 can be a removable, addable, or exchangeable mechanism.

A job history management unit 212 operates according to instructions from the CPU 201, and manages registration, look-up, updating, deletion, and so forth of job history information stored in the job history storage unit 2084 of the storage unit 208. The job history information is information related to a job history of copy jobs, box print jobs, printer jobs, send jobs, and so forth that are executed by control performed by the scanner control unit 204 or the printer control unit 205.

A screen-job history association management unit 213 operates according to instructions from the CPU 201, and manages registration, look-up, updating, deletion, and so forth of job settings screens and job history information stored in the screen-job history association storage unit 2085 of the storage unit 208. A job settings screen is a settings screen displayed in the touch panel unit 301 of the operation unit 300, and where settings are set for a job, such as cover settings, bookbinding settings, shift settings, binding margin settings, composite settings, stamp settings, color adjustment settings, index sheet settings, and so forth.

The screen-job history association management unit 213, in a job settings screen displayed when making settings of a new job, performs look-up of history information of print settings information for items set in the job settings screen, from an area 609 of a job history table 600 of the job history storage unit 2084.

Next, the screen-job history association management unit 213 displays the looked-up history information in the job settings screen. Then, the screen-job history association management unit 213 appropriates the history information displayed in the job settings screen for settings of the new job.

The job control unit 214 operates according to instructions from the CPU 201, and controls settings and execution of jobs such as copy jobs, box printing jobs, printer jobs, and send jobs executed in the image forming apparatus 100. Execution, instruction, and monitoring of jobs by the job control unit 214 are performed by giving instructions to the scanner control unit 204, the printer control unit 205, and the image information management unit 209.

An internal bus 215 connects the parts shown in FIG. 2, and transfer of image data and sending/receiving of instructions, settings values, and so forth to each part are performed via the internal bus 215.

Figure 3:
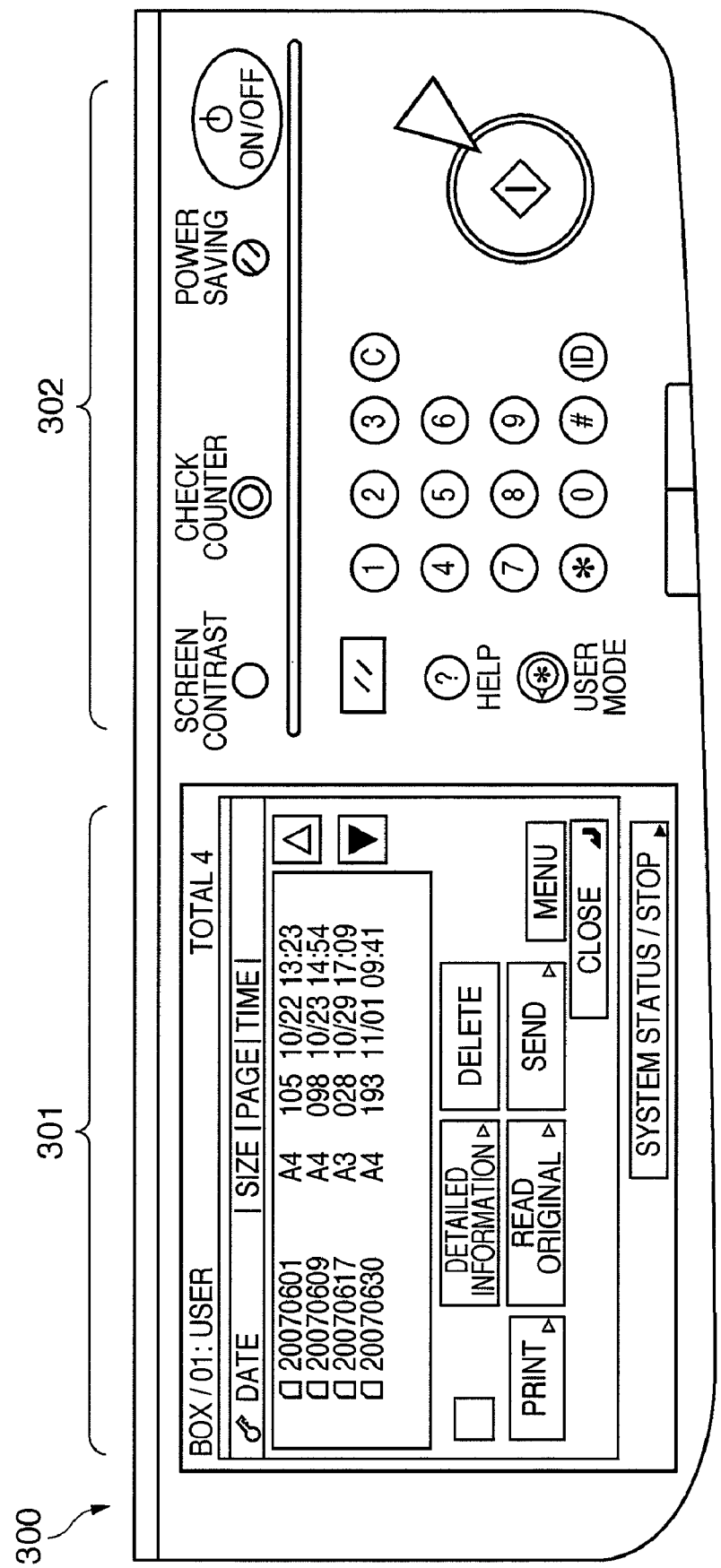
FIG. 3 shows an example of an operation unit.

FIG. 3 shows an example of the operation unit 300. The touch panel unit 301 shown in FIG. 3 is configured with an LCD (Liquid Crystal Display), and a touch panel display constituted from transparent electrodes applied on the LCD. The operation unit 300 is pre-programmed such that, for example, when a transparent electrode in a portion corresponding to a key displayed on the LCD is touched with a finger, that touch is detected and another operation screen is displayed. The key input unit 302 is a key input portion where it is possible to perform steady-state operation settings, and here a power switch, a start key, a reset key, a numeric keypad, and so forth are disposed. The "operation screen" in this embodiment is displayed as a screen in the touch panel unit 301.

FIG. 4 is an illustration of an image information management table 400 shown in XML format that is stored in the image information storage unit 2081. The image information management table 400 includes an image data ID401 of registered image data, an image file URI402 that indicates a file location, and a print setting 403 that registers a print setting that has been set for that image. A collection of image data registered in the image information management table 400 is handled as document data in a box.

FIG. 5 shows an example of a device configuration information management table 500 shown in XML format that is stored in the device configuration information storage unit 2083. In the device configuration information management table 500, other than information of this image forming apparatus 100(1), it is also possible to register information of another image forming apparatus 100 (X) that is connected by a network connection via the external interface 203. A device ID 501 is an identifier that uniquely identifies the registered image forming apparatus 100.

In the device configuration information management table 500, device configuration information of the image forming apparatus 100 (X) is registered by the device configuration management unit 211, and based on that device configuration information, print settings possible attribute information 502, which is information of print settings that can be set, is registered based on that device configuration information.

The print settings possible attribute information 502 includes a paper type 5021, paper size 5022, color classification 5023, duplex designation 5024, bookbinding settings 5025, print position settings 5026, composite settings 5027, color adjustment settings 5028, index sheet settings 5029, and so forth.

Figure 6:
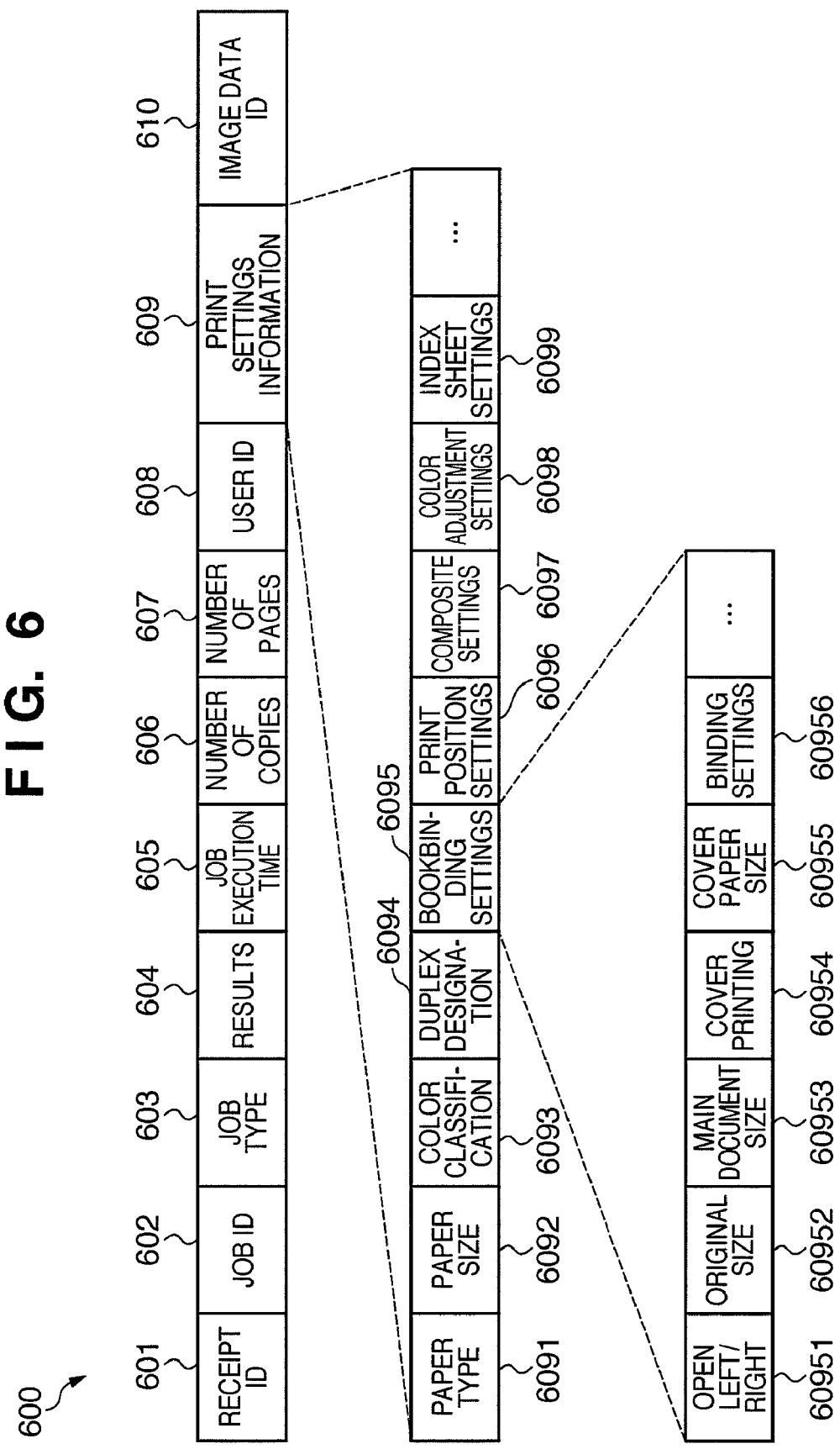
FIG. 6 shows an example of the configuration of a job history table that is registered in a job history storage unit.

FIG. 6 shows an example of the configuration of the job history table 600 registered in the job history storage unit 2084. An area 601 indicates an identifier (receipt ID) that is issued when job execution by a user is received. An area 602 is an identifier (job ID) uniquely issued in the job history table 600. For example, when a user has instructed printing of a plurality of images at the same time, areas 601 are the same, but areas 602 are separately issued. An area 603 indicates a job type such as a copy job, a box printing job, a printer job, or a send job.

An area 604 indicates a job execution result such as success, failure, or cancellation. An area 605 indicates information of a job start time and end time. An area 606 indicates a number of copies designated by the user. An area 607 indicates a number of pages calculated by, for example, multiplying a number of pages of image data used in the job by the number of copies.

An area 608 is an identifier (user ID) that identifies the user that executed the job such as a print job, and is associated with user information registered in the user information storage unit 2082. The area 609 indicates information related to job print settings. An area 610 is an identifier (image data ID) that indicates the image data handled by the job, and is associated with the image data ID401 in the image information management table 400 in the image information storage unit 2081.

A detailed example of the area 609 will be described in areas 6091 to 6099. The area 6091 indicates the type of paper on which to print, such as standard paper, heavy paper, or the like, and is associated with the paper type 5021 in the device configuration information management table 500 stored in the device configuration information storage unit 2083. An area 6092 indicates the size of paper on which to print, such as A4 or A3, and is associated with the paper size 5022 in the device configuration information management table 500 stored in the device configuration information storage unit 2083.

An area 6093 indicates a color classification when printing, such as color or monochrome, and is associated with the color classification 5023 in the device configuration information management table 500 stored in the device configuration information storage unit 2083. An area 6094 indicates a print faces classification such as simplex or duplex printing, and is associated with the duplex designation 5024 in the device configuration information management table 500 stored in the device configuration information storage unit 2083.

An area 6095 indicates the content of settings when performing saddle stitching bookbinding, glued bookbinding, or the like, and is associated with the bookbinding settings 5025 in the device configuration information management table 500 stored in the device configuration information storage unit 2083. An area 6096 indicates the content of settings of an amount to shift a print position up, down, left or right when setting a binding margin for the paper, for example, and is associated with the print position settings 5026 in the device configuration information management table 500 stored in the device configuration information storage unit 2083.

An area 6097 indicates the content of settings when performing image compositing, printing of a background pattern, page printing, or stamp printing, and is associated with the composite settings 5027 in the device configuration information management table 500 stored in the device configuration information storage unit 2083.

An area 6098 indicates the content of settings for color adjustment of cyan (C), magenta (M), yellow (Y), and black (K), and is associated with the color adjustment settings 5028 in the device configuration information management table 500 stored in the device configuration information storage unit 2083.

An area 6099 indicates the content of settings when printing an index sheet, and is associated with the index sheet settings 5029 in the device configuration information management table 500 stored in the device configuration information storage unit 2083. Furthermore, a detailed example of the area 6095 will be described in areas 60951 to 60956.

An area 60951 indicates a setting of whether bookbinding finishing will be performed such that pages open on the right or on the left. An area 60952 indicates a setting of the document size of the main document original, such as A3 or A4. An area 60953 indicates a setting of the paper size on which to print the main document, such as A3 or A4. An area 60954 indicates settings of whether or not to print to the front and back of a front cover, and whether or not to print to the front and back of a back cover. An area 60955 indicates a setting of the paper size on which to print the cover, such as A3 or A4. An area 60956 indicates a setting for binding, such as saddle stitching binding.

Figure 7:
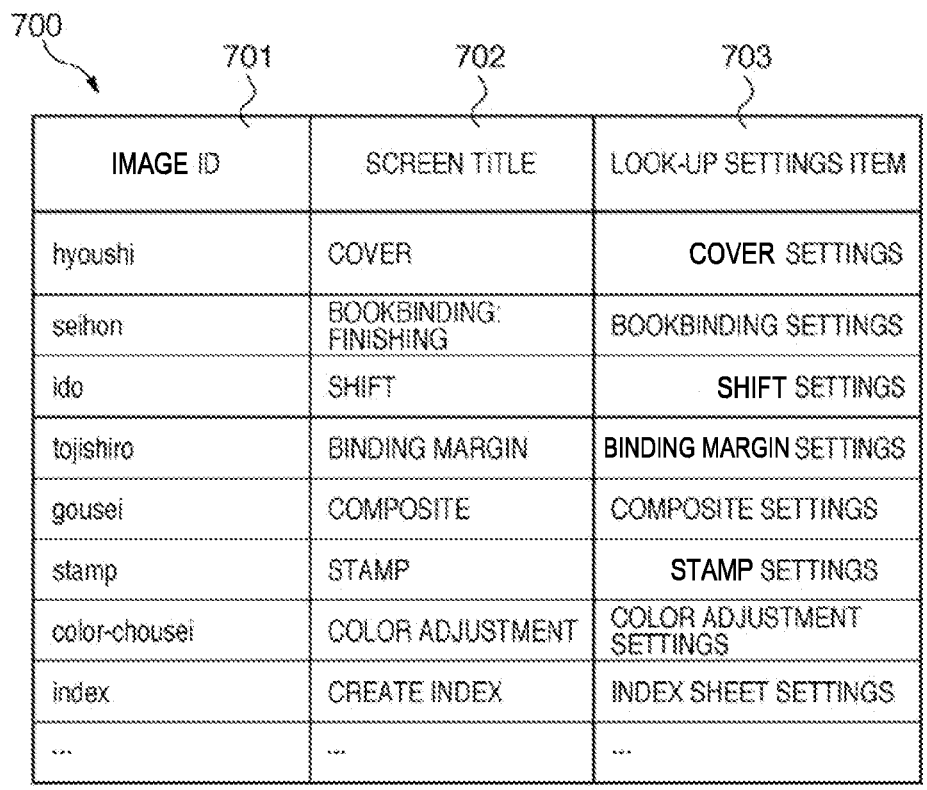
FIG. 7 shows an example of the configuration of a screen-job history association table that is registered in a screen-job history association storage unit.

FIG. 7 shows an example of the configuration of a screen-job history association table 700 registered in the screen-job history association storage unit 2085. An area 701 is an identifier (image ID) of a settings screen displayed on the touch panel unit 301. This identifies individual detailed application settings screens where job settings (cover settings, bookbinding settings, shift settings, binding margin settings, composite settings, stamp settings, color adjustment settings, index sheet settings, and so forth) are set. For bookbinding settings or the like, settings are complicated, and so when completing settings by performing settings across a plurality of screens, an identifier that indicates the initially displayed detailed application settings screen is registered in the area 701.

An area 702 is a display title of the screen set in the area 701. In an area 703, an identifier registered in the area 609 of the job history table 600 stored in the job history storage unit 2084 is registered. By this registration, it is possible to associate the individual screens in which job settings (cover settings, bookbinding settings, shift settings, binding margin settings, composite settings, stamp settings, color adjustment settings, index sheet settings, and so forth) are performed with a job history to be looked-up.

FIG. 10 shows a screen flow of conventional print settings. As a specific example, here an example of the screen flow for bookbinding print settings is shown. When the user attempts to perform bookbinding printing using image data stored in the image information storage unit 2081, initially a print screen 1001 is displayed in the touch panel unit 301 of the operation unit 300.

In the print screen 1001, by pressing an application settings button, an application settings screen 1002 is displayed. In the application settings screen 1002, by pressing a bookbinding button, a bookbinding finishing settings screen 1003, which is a first screen of bookbinding settings, is displayed.

In the bookbinding finishing settings screen 1003, when an opening method is selected and a "next" button is pressed, an original size settings screen 1004 is displayed. In the original size settings screen 1004, when an original size is selected and a "next" button is pressed, a bookbinding main document paper settings screen 1005 is displayed.

In the bookbinding main document paper settings screen 1005, when a main document paper size is selected, a selection to add a cover is selected, and a "next" button is pressed, a bookbinding cover settings screen 1006 is displayed.

In the bookbinding cover settings screen 1006, when print settings for the front/back of a front cover and the front/back of a back cover are selected and a "next" button is pressed, a bookbinding cover paper settings screen 1007 is displayed.

In the bookbinding cover paper settings screen 1007, when a cover paper size is selected and a "next" button is pressed, a bookbinding binding settings screen 1008 is displayed.

In the bookbinding binding settings screen 1008, which is the last settings screen of bookbinding settings, when a binding method is selected and an "OK" button is pressed, the displayed screen returns to the application settings screen 1002. When, after performing other settings in the same manner as bookbinding settings, a "close" button of the application settings screen 1002 is pressed, the displayed screen returns to the print screen 1001. When a print start button of the print screen 1001 is pressed, the print job is started, and the result of bookbinding printing is output.

As is understood from the example shown in FIG. 10, when implementing complicated settings such as bookbinding settings, it is necessary to perform very many screen operations, which is burdensome on the user.

FIG. 8 shows the screen flow of print settings when searching in history job settings information for settings information of an item to be set, and reusing that settings information, in the present embodiment. As a specific example, here an example of the screen flow for bookbinding settings is shown.

When the user attempts to perform bookbinding printing using image data stored in the image information storage unit 2081, initially a print screen 1001 is displayed in the touch panel unit 301 of the operation unit 300.

In the print screen 1001, by pressing an application settings button, an application settings screen 1002 is displayed. In the application settings screen 1002, by pressing a "bookbinding" button from among a plurality of types of settings items, a detailed application settings screen 801, which is a bookbinding settings screen, is displayed. Below, the pressed "bookbinding" button is also referred to as a "target item". The application settings screen 1002 is an example of a first receiving unit in the present embodiment.

In the detailed application settings screen 801, when a settings look-up button 8011 is pressed, a history look-up settings screen 802 related to bookbinding settings is displayed. By performing a search in which the screen-job history association storage unit 2085 and the job history storage unit 2084 are associated, the screen-job history association management unit 213 and the job history management unit 212 extract only jobs in which bookbinding settings were set.

Thus, the content of bookbinding settings of a job for which bookbinding settings have been set is displayed in the history look-up settings screen 802. Furthermore, by the user management unit 210 and the job history management unit 212, the job history storage unit 2084 is searched with respect to the user that is presently logged into the image forming apparatus 100. Therefore, it is also possible to display in the history look-up settings screen 802 only the content of bookbinding settings of a job for which bookbinding settings have been set by the logged-in user.

In a newest association job information display 8021, the content of the newest job among jobs for which bookbinding settings have been set that were found by the screen-job history association management unit 213 and the job history management unit 212 is displayed.

A newest association job selection button 8022 is pressed when selecting the settings content displayed in the newest association job information display 8021 as content to be appropriated to a new job for which settings are presently being set. A history association job information display list 8023 displays a list of the jobs for which bookbinding settings have been set that were found by the screen-job history association management unit 213 and the job history management unit 212. By selecting one item from the history association job information display list 8023, the settings content of that item is selected as the settings content to be appropriated to a job for which settings are presently being set.

A remote device look-up button 8024 is pressed when searching for another image forming apparatus 100(N) for which the same bookbinding settings are possible as the image forming apparatus 100(1) that is presently being operated, searching for the content of bookbinding settings of a job for which bookbinding settings have been set in the other image forming apparatus 100, and displaying that bookbinding settings content.

The search for another image forming apparatus 100(N) for which the same bookbinding settings are possible as the image forming apparatus 100(1) that is presently being operated is performed by the device configuration management unit 211 searching in the device configuration information storage unit 2083. According to an instruction from the image forming apparatus 100(1), the job history management unit 212 of the other image forming apparatus 100(N) searches in the job history storage unit 2084 of the other image forming apparatus 100(N) for the content of bookbinding settings of a job for which bookbinding settings have been set. The found bookbinding settings content is displayed in the history look-up settings screen 802 of the image forming apparatus 100(1).

A detailed display button 8025 is a button for displaying detailed information related to the job history selected in the present screen. An OK button 8026 is pressed when appropriating the job history content in a selected state in the present screen to a new job for which settings are presently being set. When the OK button 8026 is pressed, the selected job history content in the history look-up settings screen 802 is appropriated to the new job for which settings are presently being set, and the displayed screen returns to the application settings screen 1002.

A "return" button 8027 is pressed when not appropriating the job history displayed in the present screen. When the "return" button 8027 is pressed, the displayed screen returns to the detailed application settings screen 801, which originally called the history look-up settings screen 802.

When the "close" button of the application settings screen 1002 is pressed, the displayed screen returns to the print screen 1001. By pressing a "print start" button of the print screen 1001, a print job is started.

For application settings other than bookbinding settings as well, the detailed application settings screen 801 is displayed, and settings can be appropriated from the job history. The history look-up settings screen 802 is an example of a second receiving unit in the present embodiment.

As is understood from comparing the number of screen transitions in FIG. 10 and FIG. 8, it is possible to partially appropriate the same settings as a job performed in the past, for each separate application setting, so particularly when implementing complicated settings such as bookbinding settings, it is possible to lighten the burden of screen operation on the user.

Also, when appropriating application settings, it is possible to perform look-up limited to only the job history related to a logged-in user, so it is possible to further lighten the burden when the user selects a job for appropriation from the job history. Also, when appropriating application settings, it is possible to also perform look-up in a job history recorded in another image forming apparatus 100, so appropriation of a job that the user executed at another location is also possible, and so user convenience can be improved.

FIG. 9 shows, in the image forming apparatus 100, a procedure of one iteration of processing up to performing settings for a new job by appropriating settings content that has been used to perform bookbinding printing from the job history of this image forming apparatus for a box document, and printing. FIG. 9 illustrates an example of the screen flow of bookbinding settings in FIG. 8.

In the flow described below, the scanner control unit 204 to the image processing unit 207, and the image information management unit 209 to the job control unit 214, are processing modules that constitute the MFP control unit 200 of the image forming apparatus 100. These processing modules operate as an application program used by the CPU 201, or as part of a program.

The storage unit 208, and the image information storage unit 2081, the user information storage unit 2082, the device configuration information storage unit 2083, the job history storage unit 2084, and the screen-job history association storage unit 2085, which are parts of the storage unit 208, are information storage apparatuses that constitute the MFP control unit 200 in the image forming apparatus 100. A non-volatile hard disk, memory, or the like in a file system or a database system is used in the storage unit 208 and each of the image information storage unit 2081 to the screen-job history association storage unit 2085, which are parts of the storage unit 208. Also, as for accessing information stored in the storage unit 208, direct access to particular information by a designated key or condition is possible.

In Step S901, the operation control unit 206 detects that the user has pressed the settings look-up button 8011 disposed on the detailed application settings screen 801 related to bookbinding settings of a box document displayed in the operation unit 300 of the image forming apparatus 100. Here, a "box document" refers to image data being managed by the image information management unit 209 in the image information storage unit 2081 of the storage unit 208.

In Step S902, using an image ID that identifies the screen being displayed that was acquired in the operation control unit 206 in Step S901 as a key, the screen-job history association management unit 213 searches in the screen-job history association storage unit 2085 of the storage unit 208 for an item to be looked up.

The following description makes reference to the screen-job history association table 700 stored in the screen-job history association storage unit 2085. The screen-job history association management unit 213 searches in the area 701 using an image ID "seihon" as a key, and acquires "bookbinding settings" as the area 703.

In Step S903, the job history management unit 212 extracts only a job history in which "bookbinding settings" have been set that is related to the user presently performing operation, from the job history storage unit 2084. With the job history management unit 212, searching of the job history table 600 stored in the job history storage unit 2084 is performed with the following conditions.

(1) The user ID, which is managed by the user management unit 210 and is the identifier of the user who is presently logged into the image forming apparatus 100, is the same as the area 608.

(2) And, in Step S902, the area 6095, corresponding to the "bookbinding settings" acquired by the screen-job history association management unit 213, is not empty.

In the present embodiment, a search is performed for records that satisfy the above two conditions. Also, when searching in the job history table 600, the search is not limited to the same job type (copy job, box print job, printer job, or send job). All jobs set to be searched ("bookbinding settings" in this flowchart) will be searched.

For example, not only copy jobs and box print jobs carried out due to the user operating the operation unit 300 of the image forming apparatus 100 are searched. In addition, a search is also performed for "bookbinding settings" related to a printer job carried out by a user committing the job to the image forming apparatus 100 from a PC connected via a network.

In Step S904, when the number of records resulting from the search by the job history management unit 212 in Step S903 is at least 1 record, the routine proceeds to Step S905, and when the result is 0 records, the routine proceeds to Step S912.

In Step S905, first, the device configuration management unit 211 acquires print settings possible attributes in the image forming apparatus 100 at that time from the print settings possible attributes information 502 of the device configuration information management table 500 stored in the device configuration information storage unit 2083.

The device configuration management unit 211 determines whether print settings are possible for the items of the area 6095 (areas 60951 to 60956) of the records found by the job history management unit 212 in Step S903 in the image forming apparatus 100 at that time. In that determination, a comparison to the area 6095 of the record is made with reference to the print settings possible attribute information 502 acquired by the device configuration information management table 500. Here, the device configuration management unit 211 excludes records for which print settings were determined to be impossible as a result of that comparison.

In Step S906, when the number of records resulting from the search by the job history management unit 212 and the device configuration management unit 211 in Step S905 is at least 1 record, the routine proceeds to Step S907, and when 0 records, the routine proceeds to Step S912. The record information filtered up to Step S906 becomes a history associated job in which the logged-in user has set bookbinding settings.

In Step S912, a message that there is no history associated job in which the logged-in user has set bookbinding settings is displayed in the touch panel unit 301 controlled by the operation control unit 206, and then the displayed screen returns to the detailed application settings screen 801.

In Step S907, the job history management unit 212 acquires details of newest associated job information in which the area 605 is newest among the history associated jobs.

In Step S908, the details of the newest associated job information acquired in Step S907 and the history associated job information resulting from the searches up to Step S906 is displayed as the history look-up settings screen 802 in the touch panel unit 301, by control performed by the operation control unit 206.

In Step S909, when the operation control unit 206 detects that, by screen operation by the user in the history look-up settings screen 802, a history job wished to be appropriated for the new job for which settings are presently being set is put in a selected state, and the OK button 8026 is pressed, the routine proceeds to Step S910. On the other hand, when the operation control unit 206 detects that a history job wished to be appropriated for the new job for which settings are presently being set is not selected, and the "return" button 8027 is pressed, the routine proceeds to Step S913.

In Step S910, the job history management unit 212 transfers only the information of the items of the area 6095 (the areas 60951 to 60956) of the history job selected in Step S909 to the job control unit 214. The job control unit 214 updates the bookbinding settings of the new job for which settings are presently being set, with the information that has been transferred by the job history management unit 212.

In Step S913, the detailed application settings screen 801 is displayed in the touch panel unit 301. Next, according to screen operation input by the user, the operation control unit 206 displays the screen transitions (screens 1003 to 1008 in FIG. 10) related to bookbinding settings in the touch panel unit 301. The job control unit 214 receives items that have been set by the user in the screen transitions from the operation control unit 206, and performs bookbinding settings for the new job for which settings are presently being set.

In Step S911, the operation control unit 206 displays the application settings screen 1002 in the touch panel unit 301. When the user desires to further set various settings (shift settings, binding margin settings, composite settings, stamp settings, color adjustment settings, index sheet settings, and so forth) other than bookbinding settings, buttons are pressed corresponding to the various settings.

For various settings other than bookbinding settings as well, same as in the case of bookbinding settings, the "history look-up settings screen" 802 corresponding to the various settings is displayed, and controlled by the screen-job history association management unit 213, the job history management unit 212, the job control unit 214, and so forth. That is, it is possible to make various settings for a new job from the job history of a logged-in user by appropriating various settings from the history. When settings for the new job by the user are completed, the print screen 1001 is displayed in the touch panel unit 301 by control by the operation control unit 206.

When the operation control unit 206 detects that the "print start" button is pressed by the user, image data being managed in the image information storage unit 2081 by the image information management unit 209 is acquired as a box document subject to a box print job.

Next, the job control unit 214 instructs the image processing unit 207, and thus image processing in which the new job settings held by the job control unit 214 are reflected is performed on the image data. Next, the job control unit 214, by instructing the printer control unit 205, instructs the start of print processing according to the image data on which image processing was performed and the new job settings.

The printer control unit 205 controls the laser exposure unit 102, the image forming unit 103, the fixing unit 104, the feed/conveyance unit 105, and so forth to perform print output of an image to printing paper, and thus the job is completed. Upon job completion, the job control unit 214 transfers job settings information, execution results information, and so forth to the job history management unit 212, the job history management unit 212 newly adds the job history related to the job to the job history storage unit 2084. Thus, one iteration of the flowchart ends.

As described above, according to the present invention, due to a job history association management unit searching in a job history storage unit for settings information associated with a settings item of a new job, and displaying the results of the search, it is possible to reuse the settings information for the settings item of the new job.

Also, by using the present invention, when the user inputs settings of a new job in an image forming apparatus, it is possible to perform look-up of only a history job in which an item that the user intends to set (for example, "bookbinding" settings) was set (regardless of the job type, provided that "bookbinding" settings were set).

Also, by the user selecting one job desired to be reused from found history jobs, it is possible to reuse only a desired item (for example, "bookbinding" settings) from among history job settings.

According to the conventional technology, it is only possible to reproduce an image operation, and so a job history cannot be reused in the case of different job types, such as copying, box document printing, printing from a PC, and so forth. However, according to the present invention, the job history of different job types can also be reused, and thus convenience is improved.

Also, according to the conventional technology, it is possible to designate a job from the job history and perform reprinting so as to obtain the same output results, but when performing settings for a new job in a screen, it is not possible to reuse a portion of past settings. However, according to the present invention, it is possible to reuse only an item such as "bookbinding" when inputting settings of a new job, and thus convenience and settings flexibility are improved.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a printing medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-301716, filed Nov. 26, 2008, which is hereby incorporated by reference herein in its entirety.

What is claimed is:

1. An image forming apparatus that performs print processing of image data based on contents of a plurality of types of print setting items, the image forming apparatus comprising:
   a holding unit configured to hold a past print job as a history;
   a first receiving unit configured to receive selection of a target item by a user, from among a plurality of types of print setting items that are settable in a print job for performing the print processing of the image data;
   a search unit configured to, with respect to the target item, search in the history for a past print job in which a content of the target item was set;
   a display unit configured to display a list of past print jobs that were searched by the search unit;
   a second receiving unit configured to receive selection of a past print job by the user, from among the list of past print jobs that was displayed;
   a setting unit configured to set the content of the target item that is set in the selected past print job as a content of the target item of the print job corresponding to the image data; and
   a print unit configured to perform the print processing of the image data, using the print job in which the content of the target item is set by the setting unit.

2. The image forming apparatus according to claim 1, wherein the holding unit holds, as a new history, the print job in which the contact of the target item is set by the setting unit.

3. The image forming apparatus according to claim 1, wherein the search unit searches for a past print job in which a content is set with respect to the target item, the past print job being associated with the user.

4. The image forming apparatus according to claim 1, wherein the target item includes bookbinding settings.

5. An image forming method executed in an image forming apparatus that performs print processing of image data based on contents of a plurality of types of print setting items, the image forming method comprising:
   a holding step of holding a past print job as a history;
   a first receiving step of receiving selection of a target item by a user, from among a plurality of types of print setting items that are settable in a print job for performing the print processing of the image data;
   a searching step of, with respect to the target item, searching in the history for a past print job in which a content of the target item was set;
   a display step of displaying a list of past print jobs that were searched in the searching step;
   a second receiving step of receiving selection of a past print job by the user, from among the list of past print jobs that was displayed;
   a setting step of setting the content of the target item that is set in the selected past print job as content of the target item of the print job corresponding to the image data; and
   a printing step of performing the print processing of the image data, using the print job in which the content of the target item is set in the setting step.

6. A non-transitory computer-readable storage medium that stores an image forming program for performing print processing of image data based on contents of a plurality of types of print settings items, the image forming program causing a computer to perform control so as to:
   hold a past print job as a history;
   receive selection of a target item by a user, from among a plurality of types of print setting items that are settable in a print job for performing the print processing of the image data;
   with respect to the target item, search in the history for a past print job in which a content of the target item was set;
   display a list of past print jobs that were searched;
   receive selection of a past print job by the user, from among the list of past print jobs that was displayed;
   set the content of the target item that is set in the selected past print job as a content of the target item of the print job corresponding to the image data; and
   perform the print processing of the image data, using the print job in which the content of the target item is set.

* * * * *